United States Patent

Citterio

[19]

[11] Patent Number: 5,942,166
[45] Date of Patent: Aug. 24, 1999

[54] PROCESS FOR THE PRODUCTION OF COAXIAL AND CONFOCAL MIRRORS HAVING GRAZING INCIDENCE

[75] Inventor: Oberto Citterio, Merate, Italy

[73] Assignee: Osservatorio Astronomico Di Brera, Milan, Italy

[21] Appl. No.: 09/017,721

[22] Filed: Feb. 4, 1998

[30] Foreign Application Priority Data

May 2, 1997 [IT] Italy .................................. MI97A0226

[51] Int. Cl.⁶ .................................................. B05D 11/00
[52] U.S. Cl. ......................... 264/1.9; 359/867; 359/869; 359/883; 359/900; 427/454; 427/162
[58] Field of Search .................................... 427/453, 454, 427/162; 359/867, 869, 883, 900; 29/DIG. 39; 156/294; 264/1.9, 1.1

[56] References Cited

U.S. PATENT DOCUMENTS

| | | | |
|---|---|---|---|
| 3,841,737 | 10/1974 | Rambauske et al. | 350/288 |
| 4,074,416 | 2/1978 | Rambauske et al. | 29/527.4 |
| 4,814,232 | 3/1989 | Bluege et al. | 428/450 |
| 5,592,338 | 1/1997 | Citterio | 359/883 |

*Primary Examiner*—Katherine A. Bareford
*Attorney, Agent, or Firm*—Bucknam and Archer

[57] ABSTRACT

A process for the production of coaxial and confocal mirrors having grazing incidence consists essentially of a support element or a carrier made of ceramic material, a layer reflecting X-rays and intermediate layer which is a buffer and which avoids the transfer of the rough surface of the carrier or support element to the reflecting layer. The support element or carrier is prepared by deposition involving the spraying of the ceramic material in the form of plasma (plasma spray deposition).

7 Claims, 1 Drawing Sheet

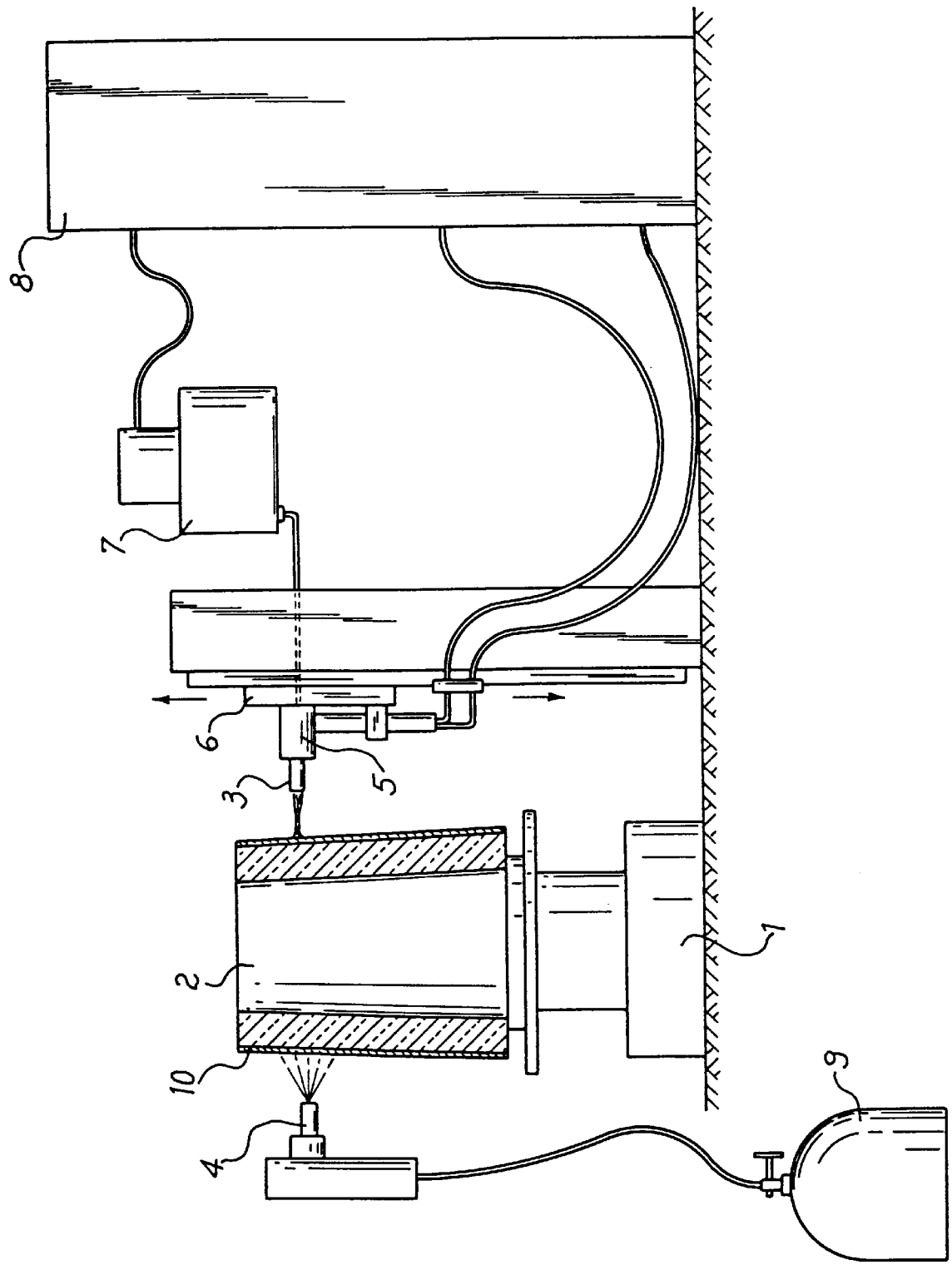

PROCESS FOR THE PRODUCTION OF COAXIAL AND CONFOCAL MIRRORS HAVING GRAZING INCIDENCE

FIELD OF THE INVENTION

The present invention relates to a process for the production of coaxial and confocal mirrors having grazing incidence. More particularly the present invention relates to a process for the production of coaxial and confocal mirrors having grazing incidence particularly suitable to be used in the field of optics with X-rays used for astronomical observations.

BACKGROUND OF THE PRIOR ART

It is known that the optics with X-rays are composed by a plurality of coaxial and confocal mirrors having a trunco-conical structure with a double cone, with a parabola/hyperbola having polynomial profiles or with other geometrical configurations, inserted one in the other in a manner to form a very compact group.

In view of the particular application, these mirrors must have the following principal properties among which:

a) reflecting surfaces for the geometries and the rough texture required in the optical project;

b) the thickness of the walls as small as possible for the purpose of minimizing the loss of collection surfaces;

c) the possibility to be produced by a process of repetition starting from mandrels having the shape of the negative of the profile required in the optics with X-rays;

d) use of materials having a high module of elasticity in order to achieve low thickness, low density for the purpose of minimizing the weight, low coefficient of thermal expansion and a high coefficient of thermal conductivity for the purpose of minimizing the distortions resulting from the temperature and optimum mechanical stability during the period of time required by the process.

A mirror which satisfies all these properties is known and is described in the published application of the European Patent Office, EPA 0670576. According to this European application, a mirror having the properties listed hereinabove comprises a structural element of support or a carrier constituted by a ceramic material which is selected among silicon carbide, a carbide of silicized silicon and boron nitride; an intermediate layer of a polymerized epoxidized resin and a layer of gold. The carrier constituted by silicon carbide or by the boron nitride is obtained by the process of depositions of chemical vapors (CVD—Chemical Vapour Deposition). On the contrary, in the case of silicized silicon carbide the carrier is obtained by a sintering process. These methods used for the production of the carrier or the supporting element, even if they may be carried out in industry, are not devoid of drawbacks. These drawbacks are due mostly to the fact that these procedures are quite long and cannot be carried out easily in actual practice so that they increase substantially the cost of the finished mirror.

SUMMARY OF THE PRESENT INVENTION

An object of the present invention is to overcome the drawbacks mentioned hereinabove. More particularly an object of the present invention is to provide a process for the production of the carrier or a support of the coaxial and confocal mirrors which is of easy and practical accomplishment and which does not require long period of time for the production.

Another object of the present invention is to provide a process for the production of coaxial and confocal mirrors at very limited cost.

In the most general aspect the present invention permits to obtain the above mentioned objects by employing the technology of the "plasma spray deposition" for the production of the carrier or support element. By employing this technology the carrier or the support element may be prefabricated on a mandrel having dimensions slightly greater with respect to the dimensions of the mirror to be manufactured and having the shape of the negative of the profile of the mirror and being applied to a second mandrel which is well cleaned and is covered with a layer reflecting X-rays. Alternatively the carrier or support element may be obtained directly on the mandrel which has been well cleaned and is covered by a material which reflects X-rays and a layer of material (buffer) which avoids the transfer on the surface which reflects the X-rays, for instance gold, of the roughness generated during the deposit of the ceramic material.

Therefore, an object of the present invention is a process for the production of coaxial and confocal mirrors having grazing incidence constituted by a support element or carrier of ceramic material, a layer reflecting X-rays and an intermediate layer, called buffer for the purpose of avoiding the transfer of the roughness of the surface of the carrier to the reflecting layer, in which process the support element or carrier is obtained by deposition by spraying of the ceramic material in the form of plasma (plasma spray deposition).

The method "plasma spray deposition" is well known and it has been applied industrially for the production of very thin pieces, less than 1 mm and with very accurate geometry. This method consists of spraying on a substrate which is kept at room temperature a material in the state of a plasma obtained by warming to a temperature higher than the temperature of fusion of this material. The substrate may be a mandrel having the shape of a negative of the carrier or a mandrel coated with a layer of material which reflects X-rays and a layer of "buffer".

The substrate is caused to rotate around its axis of symmetry while the spraying nozzle is moved alternatively with a linear motion along the axis of rotation. In addition, in order to avoid the formation of internal tensions due to the different coefficients of thermal dilatations of the substrate and the material which forms the carrier, the latter is cooled cryogenically, immediately after the application, with an atomized liquefied gas. In this manner the average temperature of the pair substrate-carrier during the spraying of the plasma is kept about the temperature of the environment and the formation of internal tensions is avoided.

The ceramic material for the production of the carrier may be any oxide, anhydride or a compound which does not sublime by warming. By way of example, aluminum oxide, titanium dioxide and their mixtures in any ratio may be used. The temperature used for the production of the plasma in general is above 1,000° C. and may even reach the value of 6,000° C. and even higher.

The thickness of the carrier may be between 0.3 and 4 mm and may be homogeneous along the entire surface or may be greater at least corresponding to the two free borders or other specified areas and is lower along the remaining surface. In this manner, the reinforcing element, that is ribs, is constituted by the borders or the enlarged areas.

BRIEF DESCRIPTION OF THE DRAWING

The process of the present invention may be better understood by the following description which refers to the enclosed FIGURE which illustrates a schematic view of a possible apparatus for carrying out the process, being understood that the FIGURE is provided only by way of illustration and it is not limiting.

DESCRIPTION OF THE PREFERRED EMBODIMENT

By reference to the figures, the apparatus comprises:

a rotating table 1 which supports mandrel 2, the latter having the shape of the negative of the profile of the required carrier 10;

nozzle 3 for spraying the ceramic material in the form of plasma on the surface of the mandrel 2;

nozzle 4 for spraying on this surface a cooling liquid or gas;

a combustion chamber 5 which is connected to nozzle 3 of the ceramic material;

a linear repeater 6 provided with an alternating motion along the axis of rotation of mandrel 2 to which the combustion chamber 5 is fixed;

container 7 which contains the ceramic material in the form of powder connected with the combustion chamber 5; and structure 8 which is a unity of control and provides to feed under pressure a transport inert gas to container 7 and a combustible and oxygen to the combustion chamber 5.

The unity of control 8 feeds under pressure a transport inert gas, for instance nitrogen., to container 7 and therefore pushes ceramic material in the form of powder from container 7 to the combustion chamber 5. The ceramic material is warmed in chamber 5 by the heat developed by the combustion of the combustible material, the latter being fed under pressure which may be regulated by unity of control 8 and transformed in the form of plasma.

Nozzle 3 sprays the plasma so produced along the surface of mandrel 2 which rotates on its axis of symmetry. Nozzle 3 is provided with an alternating translation motion along the axis of symmetry of mandrel 2 which is the rotation axis. Nozzle 4 fed with liquefied gas 9 such as for instance, liquid nitrogen, provides the cooling of the layer of plasma 10 little by little as it is deposited on the surface of mandrel 2. As a combustible there may be used hydrogen, methane, propane, citigas or any other known gaseous combustible material. The mandrel is in general of aluminum and eventually may be covered by a layer of nickel obtained by an electrolytic or chemical method (electroless nickel).

The ceramic material in the form of plasma may be sprayed on mandrel 2 after cleaning the latter with abrasive materials or on a mandrel covered with a layer of material which reflects X-rays such as for instance, gold or covered with a subsequent layer (buffer) of an epoxidic resin or a metal such as for instance, nickel, electrolytically deposited. In both cases the ceramic material which is sprayed forms a carrier or the mechanical support element of the mirror and the thickness may vary between 0.3 and 4 mm or even greater.

When the carrier is prefabricated on a mandrel it is dimensioned in such a manner to leave an interspace of about 100 to 500 micrometers when it is disposed on a mandrel which has been previously covered with one layer of a material reflecting X-rays. This interspace subsequently is filled with the liquid precursors of an epoxidic resin which after polymerization harden thus reproducing exactly the profile of the mandrel. The separation of the mirror from the mandrel is accomplished by cooling the latter in this manner the layer of material reflecting the X-rays separates itself from the mandrel and remains attached to the resin, the latter being anchored to the carrier or support element.

The layer of material which reflects the X-rays such as for instance, gold, may have a thickness comprised between 100 and 200 nm (nanometers) and may be obtained by deposition by means of evaporation in vacuo. The process of the present invention in addition to being easy and of ready accomplishment requires very short periods of time to be carried out and permits to achieve carrier or support elements which are very thin but exhibit the mechanical properties, low density and low coefficient of thermal expansion. Due to these mechanical properties, the carriers obtained by means of the process of the present invention permit to produce mirrors of very reduced thickness such as for example less than 1 mm and in general comprised between 0.3 and 4 mm.

The mirrors according to the present invention are used in the field of telescopes with X-rays, optics for microscopes with X-rays and in the optics for lithographic use.

Although the invention has been described by reference to the specification and particular conditions of procedure, it is evident that alternatives and modifications may be made by people expert in this field on the basis of the description made hereinabove. Therefore, the invention is intended to comprise every alternative and modification which falls within the concept and the scope of production of the attached claims.

What is claimed is:

1. A process for production of a mirror having grazing incidence, said mirror having a dimension, a shape and a profile and consisting essentially of a support element or carrier (10) made of ceramic material, said support element or carrier having a surface with roughness of the surface and having a thickness of 0.3–4 mm, a layer of a material reflecting X-rays and an intermediate buffer layer located between the surface and the layer of material reflecting X-rays which avoids the transfer of said roughness of the surface of the carrier to the reflecting layer, which process consists of the steps of:

1) covering a mandrel with a layer of a material reflecting X-rays and with a subsequent layer of a buffer layer which avoids the transfer of the roughness of the surface, said mandrel having the shape of a negative of the profile of the mirror being manufactured and a dimension equal to that of said mirror, said mandrel being previously cleaned;

2) forming the carrier or support element by spraying by plasma spray deposition the ceramic material on said covered mandrel;

3) removing the formed mirror from the mandrel by cooling the mandrel.

2. The process according to claim 1 wherein said layer of material which reflects X-rays is gold and wherein the buffer layer which avoids the transfer of the roughness of the surface is an epoxidic resin layer.

3. The process according to claim 1 wherein said support element or carrier is obtained by plasma spraying said ceramic material on said mandrel, said mandrel being previously cleaned and coated with a layer of a material which reflects the X-rays and said buffer layer is a layer of an epoxidic resin or a metal deposited electrolytically.

4. The process according to claim 1 wherein said mandrel has an axis of symmetry and said ceramic material prior to step 2) is heated to a temperature higher than its fusion temperature and is sprayed on the surface of said mandrel kept at the temperature of the environment, said mandrel rotating along said axis of symmetry and being cooled cryogenically by means of an atomized liquefied gas.

5. The process according to claim 4 wherein said ceramic material in the plasma state is sprayed with a nozzle (3), said nozzle being provided with an alternating linear motion along said axis of rotation of said mandrel.

6. The process according to claim 1 wherein said support element or carrier has borders and is provided with ribs of thickness greater at least along the borders thereof.

7. The process according to claim 1 wherein said ceramic material is a material selected from the group consisting of aluminum oxide, titanium dioxide and mixtures thereof.

* * * * *